July 20, 1937. J. BACHER ET AL 2,087,465
BEVERAGE DISPLAYING AND DISPENSING DEVICE
Filed May 29, 1936 2 Sheets-Sheet 1

INVENTORS
John Bacher
and Harry Lickman
BY Daniel G. Cullen.
ATTORNEY.

July 20, 1937.  J. BACHER ET AL  2,087,465
BEVERAGE DISPLAYING AND DISPENSING DEVICE
Filed May 29, 1936   2 Sheets-Sheet 2
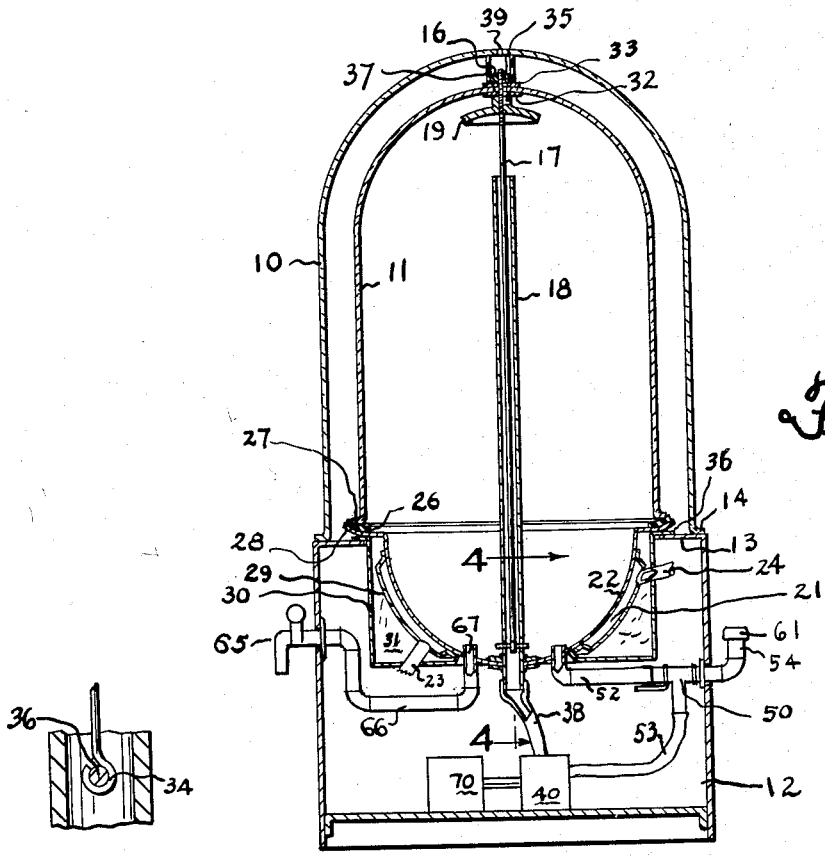
Fig. 3
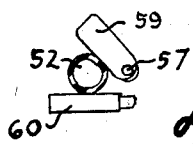
Fig. 4
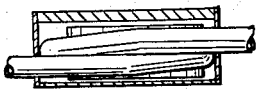
Fig. 8
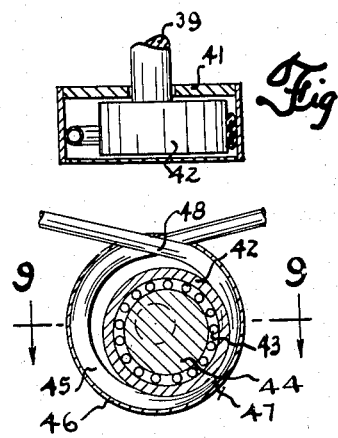
Fig. 9
Fig. 7
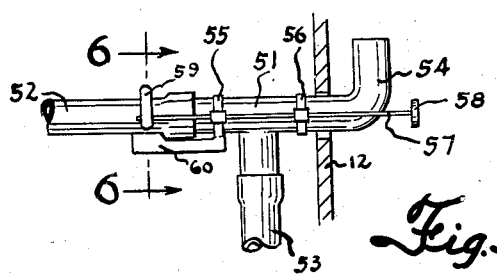
Fig. 5
Fig. 6
INVENTORS
John Bacher
and Harry Rickman
BY Daniel S. Cullen.
ATTORNEY.

Patented July 20, 1937

2,087,465

UNITED STATES PATENT OFFICE 2,087,465

BEVERAGE DISPLAYING AND DISPENSING DEVICE

John Bacher and Harry Pickman, Detroit, Mich., assignors of one-third to Harry Feld, Detroit, Mich.

Application May 29, 1936, Serial No. 82,450

3 Claims. (Cl. 225—21)

This application relates to a beverage dispenser of the type in which a beverage is displayed through a transparent portion of the chamber that contains it.

The dispenser of this application is adapted to display a beverage, producing a fountain like spray of beverage near the top of the container, which spray then falls like rain into the lower part of the container. Continuous circulation of the beverage keeps up this display as long as desired.

The object of the invention is to provide a dispenser which presents a pleasing appearance, makes an attractive display, keeps a beverage cold, provides a simple mechanism which operates for long periods without need of repair, and which makes the operation by a vendor simple. Economy is attained by the use of dead air as an insulation against heat transfer between two transparent glass bowls of the container, dead air being almost as good an insulator as a vacuum.

The device is adapted to handle such beverages as fruit juices or milk which must be kept agitated so they don't separate into their constituents.

Heretofore in dispensers of this kind trouble has been experienced with clogging of circulating pumps with the pulp found in fruit juices and with corrosion of pumps and contamination of the beverage by contact with the pump or its lubricants.

The present dispenser therefore makes use of an "antiseptic" rotary pump similar to those which have been used in medical science.

The present embodiment of the invention is illustrated in the accompanying drawings, in which:

Fig. 3 is a section on lines 3—3 of Fig. 1;

Fig. 4 is a section on line 4—4 of Fig. 3 showing a detail of fastening;

Fig. 5 is an enlarged view of parts of the refilling valve;

Fig. 6 is a section on lines 6—6 of Fig. 5;

Fig. 7 is a section through the pump;

Fig. 8 is a top view of the pump with the cover removed;

Fig. 9 is a top sectional view through the pump on lines 9—9 of Figure 7.

Figure 1:
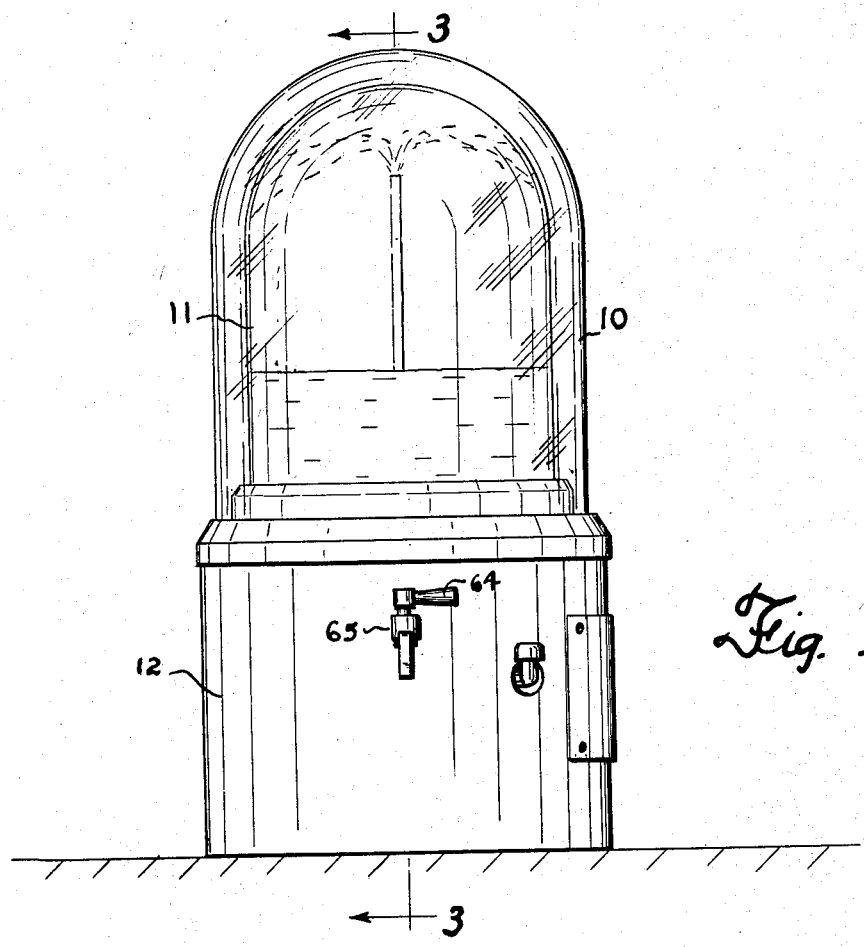
Fig. 1 is a general view of the dispenser as it might rest on a merchant's counter.
Figure 2:
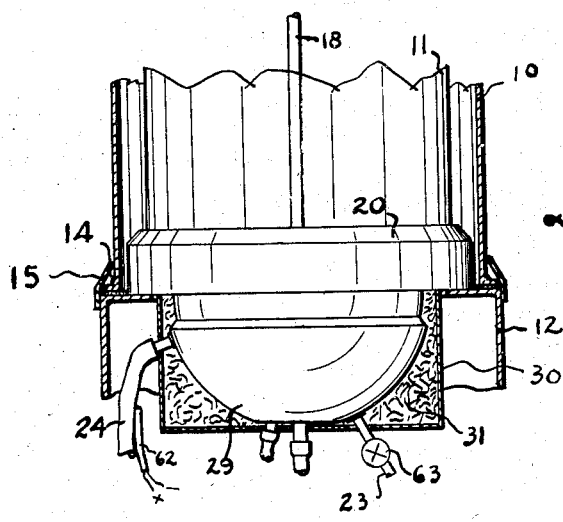
Fig. 2 is a fragmentary view showing the front half of the outer glass shell cut-away to show the construction.

On a base 12 which contains the actuating devices of the dispenser, rest two clear glass shells 10 and 11 through which a fountain spray of beverage is visible when the circulating pump is in operation. These shells are both of circular cross section closed at the top by a hemispherical portion, and are disposed one within the other. At the bottom of each shell is a turned up portion forming a foot or flange on which the shell rests. The flange 14 of the outer shell is set in rubber on the base and is covered by a chrome plated trim ring 15.

The flange 27 of the inner shell 11 rests on a flange 28 of a metal bowl 22, which comprises the lower part of the beverage chamber, the inner shell 11 being the upper part. Flange 27 is separated from flange 28 by a rubber compression ring or gasket 26 which forms a secure liquid seal when the two chamber parts are pressed together. These parts are pressed together by means of a nut 16 on a threaded rod 17 which is disposed within tube 18 and secured to same at a point near the bottom of bowl 22.

The base 12 is a thin-walled, hollow metal cylinder. At the top it is formed so as to provide a shelf 13, in the shape of a disc like ring, adapted to support the glass 10 and the flange 28 of the bowl 22. Fastened to the bowl 22 is a belt 29 which provides the space 21, comprising an evaporator unit of a refrigeration system. The inlet tube 23 is at the bottom, an expansion valve 63 is located in the tube 23 immediately before the evaporator, and the outlet 24 is located at the top of the chamber and at the opposite side from the inlet. The other units of a refrigerating system connecting with 23 and 24 may be placed under the counter on which the dispenser rests or in another part of the building, or these connections may be made to any refrigerant lines. Attached to gas line 24, or built into the line, is a hollow part 62, adapted to contain a control element for refrigerant circulation. Thus the circulation or refrigerant is controlled by the temperature of the gas line, and so is the temperature of the beverage.

Outside of the bowl 22 is another bowl 30, fitting around the evaporator 29 and having a flange 36 resting on shelf 13 under flange 28. This bowl 30 holds insulating material 31 such as mineral wool, packed snugly around the cooling unit 29.

Also contained in the base 12 are the pump 40, the refilling valve 50, and the necessary connections between the various parts. The pump 40 is of the rotary type and more particularly may be called an antiseptic or insulated rotary pump, since the beverage passes through while in a rubber hose. A shaft 39 is journaled in wall 41, and integral with an eccentric 44, on which a roller 42 revolves on roller bearing 43. A soft rubber tube 45 is disposed within the casing cylinder 46. The relative dimensions of eccentric roller, tube, and casing are such that the eccentric squeezes the tube walls together at the point, such as 47, farthest from the center of pump shaft 39, stopping flow through the tube at this point 47. This condition gives the effect of a shut-off valve when the pump is not running. However, when the pump does run, the same condition circulates liquid through the tube 45. The eccentric, gyrating about its shaft, flattens the tube at progressive points in its circle, that is, at all points of the tube progressively and at each point instantaneously. Any fluid contained in the tube is therefore forced through same. As the eccentric pushes the liquid through the tube ahead of it, more liquid flows into the tube to fill the space left vacant by the opening tube in the wake of the eccentric's high spot. Every time that the high point of the eccentric passes the crossing point of the tube 48 it begins to force a new tube full of liquid through the tube. The pump is therefore a positive displacement pump. It is driven by an electric motor 70, connected to any convenient electric outlet. The roller bearing 43 has been added to insure that the eccentric does not move the tube 45 in its casing, but merely rolls over it while flattening it.

The refilling valve 50 is designed to permit normal flow through the return line to the suction side of the pump and to stop that flow when desirable and permit the pump to draw additional liquid into the system. Mounted near the wall of the base is a T connection 51. The drain line 52 from the beverage chamber is connected to one side of the T, the suction line 53 of the pump is connected to the second side and a refilling tube 54 is connected to the third side. The refilling tube projects through the base wall, and is normally capped. Fastened to the T by two straps 55 and 56 is a rod 57 having a handle 58 outside of the base and having a cam 59 at its other end. Also fastened to the T by strap 55 is anvil 60. When handle 58 is moved to turn rod 57, the cam 59 is urged toward the anvil 60, compressing the tube 52 and stopping all flow in the tube. An arrangement may be added for holding the cam 59 in this closed position, or the tube may be held closed by a continuous pressure on handle 58.

Normally the flow through the T is from tube 52 to tube 53. When it is desired to refill the dispenser, however, the handle 58 is actuated to close tube 52 by means of cam 59, cap 61 is then removed and a beverage supply is connected with fill pipe 54. Operation of the pump then draws the beverage through tubes 54 and 53 and forces it through tube 38 and tube 18 into the display chamber.

For withdrawing, or dispensing, the beverage there is provided a faucet 65, supported by the wall of base 12, and connected through tube 66 to the bottom of the beverage chamber at 67. When the faucet is opened by turning handle 64, the beverage flows through it, influenced by gravity.

Projecting through the bottom of bowl 22 is tube 18 which provides for the beverage a spectacular entry into the chamber. The tube 18 is securely fastened to the bowl for support and is sealed in to prevent leakage. The tube extends to a point near the top of the beverage chamber and is connected at the bottom with the discharge line 38 of the pump. The rod 17 which passes through the tube is secured to the tube at a point below the level of the glass by a rod 36 which passes through holes in the tube and through an eye 34 formed in end of the rod.

On the upper part of the rod 17 immediately below the top of the glass is a deflecting plate 19 whose purpose is to redirect the stream of beverage projected by tube 18. This deflecting plate 19 is screwed to rod 17 and is advanced to such a point that it forms a shoulder for a gasket 32 which, with another gasket 33, permits nut 16 to seal the hole 25 in shell 11 through which the rod 17 passes as well as to press shell 11 against flange 28 at its lower end.

A vent is provided to allow maintenance of atmospheric pressure in the chamber with varying amounts of beverage present. This is accomplished by a hole 35 drilled through nut 16. But the air thus admitted to the space between the shells is confined within a tube 37 whose lower end fits over nut 16 and whose other end is pressed against outer shell 10. The air of the chamber communicates with the outside air through a small hole 39, in the top of shell 10.

As has been mentioned above, flange 14 of shell 10 is air-sealed to shelf 13 of base 12. As has also been mentioned, the beverage chamber rests with its flange on shelf 13. Therefore a fairly good air seal is secured at the bottom of the space between the shells. Furthermore, a ring 20 is supplied to mask the joint 26, 27, 28 and the space between this ring and the joint is filled with mineral wool insulation. Thus a dead air space is secured to insulate against excessive heat loss into the glass beverage chamber.

We claim:

1. A beverage dispenser comprising a vessel having an outer shell and a top wall in the form of a bowl, cooling means in the vessel between the bowl and the shell, a glass dome resting on the top wall of the vessel between the edge of the bowl and the edge of the shell and forming a cover for the bowl, and a spray tube projecting through the lower part of the bowl and upwardly into the dome.

2. A beverage dispenser comprising a vessel having an outer shell and a top wall in the form of a bowl, cooling means in the vessel between the bowl and the shell, a glass dome resting on the top wall of the vessel between the edge of the bowl and the edge of the shell and forming a cover for the bowl, and a spray tube projecting through the lower part of the bowl and upwardly into the dome, and means near the upper end of the spray tube and carried thereby and supporting the dome.

3. A beverage dispenser comprising a vessel having an outer shell and a top wall in the form of a bowl, cooling means in the vessel between the bowl and the shell, a glass dome resting on the top wall of the vessel between the edge of the bowl and the edge of the shell and forming a cover for the bowl, and a spray tube projecting through the lower part of the bowl and upwardly into the dome, and means near the upper end of the spray tube and carried thereby and supporting the dome and formed as a deflector for liquid sprayed from the upper end of the spray tube.

JOHN BACHER.
HARRY PICKMAN.